United States Patent
Pirinen et al.

(10) Patent No.: US 10,819,893 B2
(45) Date of Patent: Oct. 27, 2020

(54) MOBILE TERMINAL DEVICE

(71) Applicant: AAC Technologies Pte. Ltd., Singapore (SG)

(72) Inventors: Ossi Pirinen, Shenzhen (CN); Tomi Lintulahti, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/362,850

(22) Filed: Mar. 25, 2019

(65) Prior Publication Data
US 2020/0244851 A1 Jul. 30, 2020

(30) Foreign Application Priority Data
Jan. 30, 2019 (CN) .......................... 2019 1 0092771

(51) Int. Cl.
*H04N 5/225* (2006.01)
*H04M 1/02* (2006.01)

(52) U.S. Cl.
CPC ........ *H04N 5/2257* (2013.01); *H04M 1/0264* (2013.01); *H04N 5/2252* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 6,590,720 B2* | 7/2003 | Oba | ......................... | G02B 7/04 348/E5.028 |
| 7,773,876 B2* | 8/2010 | Westerweck | ........... | G03B 17/02 396/535 |
| 7,983,556 B2* | 7/2011 | Westerweck | ........... | G03B 17/02 396/535 |
| 8,421,913 B2* | 4/2013 | Kim | ..................... | H04M 1/0264 348/373 |
| 2007/0009246 A1* | 1/2007 | Lee | ......................... | G02B 7/04 396/72 |
| 2011/0255000 A1* | 10/2011 | Weber | .................. | B23K 26/351 348/374 |
| 2012/0105400 A1* | 5/2012 | Mathew | ................ | G06F 1/1605 345/207 |

* cited by examiner

*Primary Examiner* — Mark T Monk
(74) *Attorney, Agent, or Firm* — IPro, PLLC; Na Xu

(57) ABSTRACT

The present invention discloses a mobile terminal device. The mobile terminal includes a housing having a receiving space, a driving module, a telescopic bracket, and a camera module. The housing includes a first surface adjacent to the receiving space, a second surface away from the receiving space, and a through hole extending through the first surface to the second surface. The driving module is received in the receiving space of the housing and disposed adjacent to the first surface. The telescopic bracket includes two openings and a telescopic space extending through the two openings. The telescopic bracket is disposed on the second surface of the housing, the opening corresponds to the position of the through hole, and one end of the camera module is electrically connected to the driving module, and the other end penetrates the through hole and is received in the telescopic space of the telescopic bracket.

8 Claims, 5 Drawing Sheets

MOBILE TERMINAL DEVICE

FIELD OF THE PRESENT DISCLOSURE

The present disclosure relates to mobile communication technologies, and more particularly, suitable for handheld devices such as smart phones and digital cameras and imaging devices.

DESCRIPTION OF RELATED ART

With the development of modern electronic products technology, mobile consumer electronic products are becoming thinner and thinner.

In the related art of the mobile terminal device, in order to further reduce the thickness of the mobile terminal device, it is necessary to further reduce the thickness of the camera module, so as to facilitate the overall thickness of the mobile terminal device to be thinner and lighter.

On the other hand, in order to meet the needs of different occasions, the related art mobile terminal usually provides a support frame that supports the mobile terminal device at a suitable angle for viewing.

In view of the above two related technologies, it is necessary to provide a new mobile terminal device to solve the above technical problems in order to meet the development trend of special occasions and further thinning.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to the accompanying drawings in the embodiments of the present invention. To make the technical problems to be solved, technical solutions and beneficial effects of the present disclosure more apparent, the present is disclosure is described in further detail together with the figure and the embodiments. It should be understood that the specific embodiments described hereby is only to explain the disclosure, not intended to limit the disclosure. All other embodiments obtained by those skilled in the art based on the embodiments of the present invention without creative efforts are within the scope of the present invention.

Figure 1:
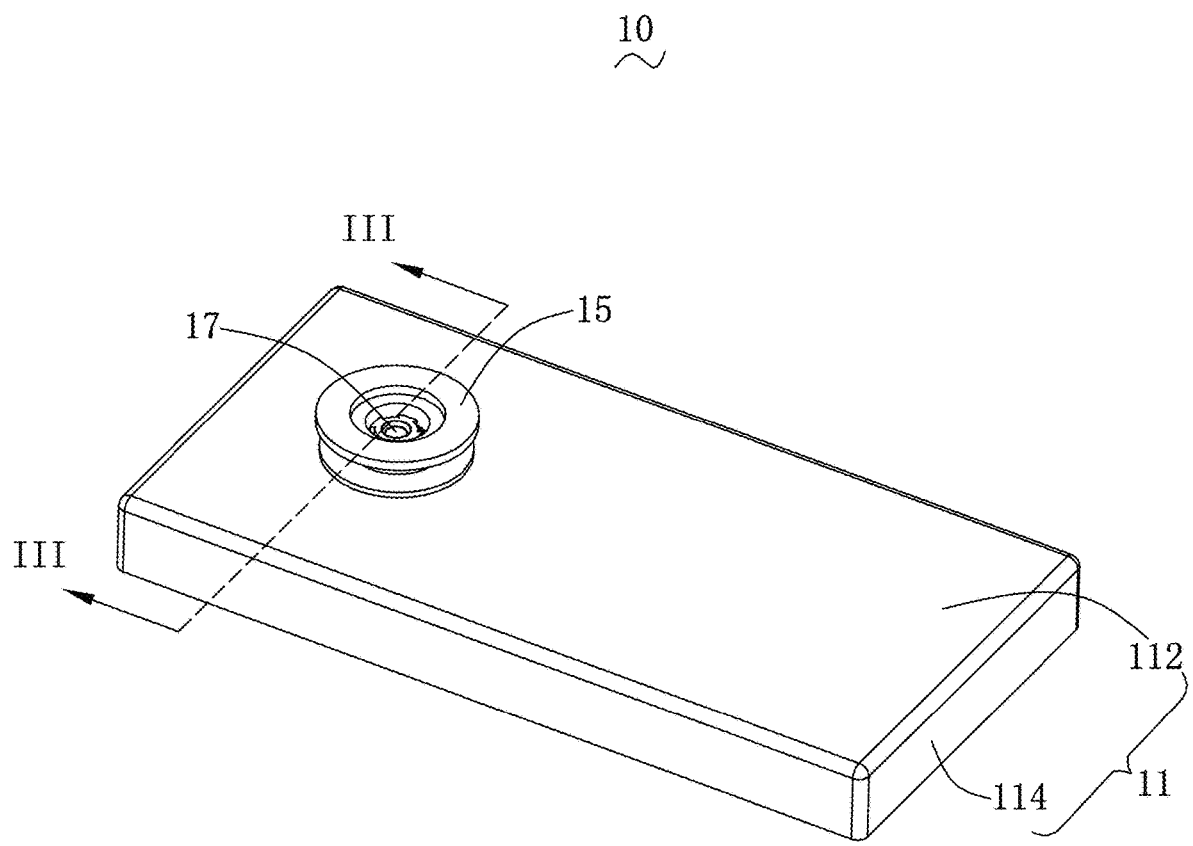
FIG. 1 is a schematic diagram of a three-dimensional structure of a mobile terminal device provided by the present invention.
Figure 2:
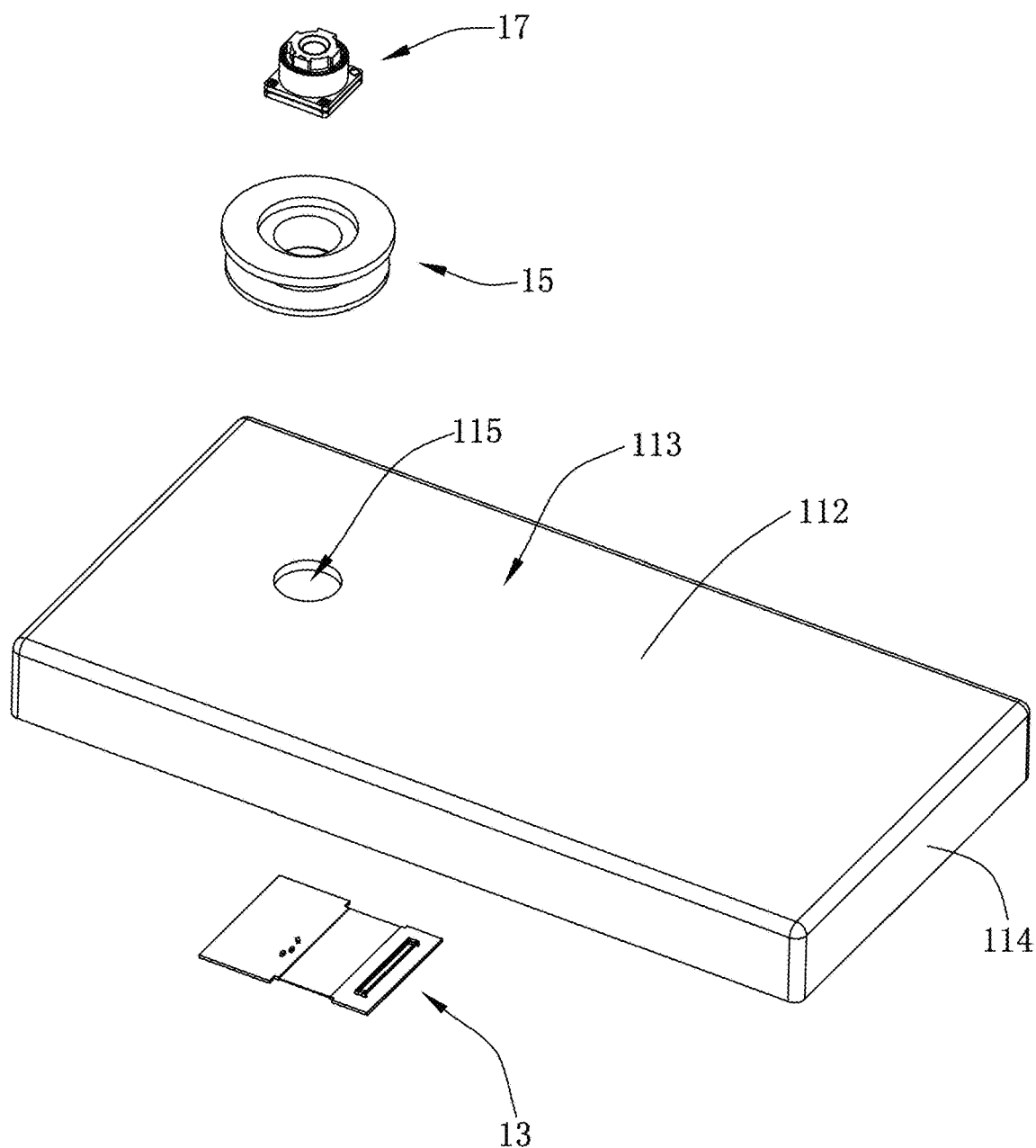
FIG. 2 is a perspective exploded view of the mobile terminal device shown in FIG. 1.

As referring to FIG. 1 and FIG. 2, wherein FIG. 1 is a schematic perspective view showing a three-dimensional assembly structure of the disclosed mobile terminal device, and FIG. 2 is a perspective exploded view of the mobile terminal device shown in FIG. 1. The mobile terminal 10 is a portable mobile communication terminal, which may be a mobile phone, a tablet computer or the like.

The mobile terminal 10 includes a housing 11 having a receiving space 110, a driving module 13, a telescopic bracket 15 having a telescopic space 150, and a camera module 17. The drive module 13 is correspondingly received in the receiving space 110 of the housing 11, and the telescopic bracket 15 is fixedly disposed on an outer surface of the housing 11. The camera module 17 is correspondingly received in the telescopic space 150 of the telescopic bracket 15, and is electrically connected to the driving module 13 through the housing 11.

The housing 11 is a frame of the mobile terminal device 10, which includes a bottom wall 112 and a side wall 114. The bottom wall 112 fits the side wall 114 to form a receiving space 110. The side surface of the bottom wall 112 adjacent to the receiving space 110 is a first surface 111, and the side surface away from the receiving space 110 is a second surface 113. The first surface 111 and the second surface 113 are two opposite side surfaces of the bottom wall 112. A through hole 115 is recessed from the second surface 113 and penetrates to the first surface 111.

The driving module 13 is received in the receiving space 110 and is disposed against the first surface 111 for driving the camera module 17 to operate.

The telescopic bracket 15 includes a supporting portion 152, a connecting portion 154 and a fixing portion 156 which are sequentially connected to each other. The connecting portion 154 elastically and flexibly connects the supporting portion 152 and the fixing portion 156.

The fixing portion 156 has a hollow structure and encloses a first opening 151. The fixing portion 156 is fixedly connected to the bottom wall 112, and the first opening 151 of the fixing portion 156 is in communication with the through hole 115 of the bottom wall 112 each other.

The connecting portion 154 is also a hollow structure, and the two ends of the connecting portion 154 are respectively connected to the fixing portion 156 and the supporting portion 152, wherein the hollow portion forms a telescopic space 150, and the telescopic space 150 correspondingly changes the volume of the telescopic space 150 as the expansion and contraction distance between the fixing portion 156 and the supporting portion 152.

The support portion 152 has a hollow structure, and an end portion thereof defines a second opening 153, and the second opening 153 penetrates the first opening 151 through the telescopic space 150. The support portion 152 directly abuts against an external desktop or the like to support the mobile terminal device 10 to be fixed at a set angle.

In this manner, the support portion 152, the connecting portion 154, and the fixing portion 156 are elastically telescopically connected to the second surface 113 of the housing 10, and surround the two openings to accommodate the telescopic space 150 with adjustable volume. The volume of the telescopic space 150 is adjusted as the distance between the support portion 152 and the fixing portion 156 changes.

The camera module 17 is a finder device that realizes image and video capture. The camera module 17 is correspondingly received in the telescopic space 150 of the telescopic bracket 15, and one end of the camera module 17 thereof penetrates the housing 11 through the first opening 151 is electrically connected to the driving module 13. The camera module 17 transmits light through the second opening 153 of the telescopic bracket 15 to realize imaging.

Figure 3:
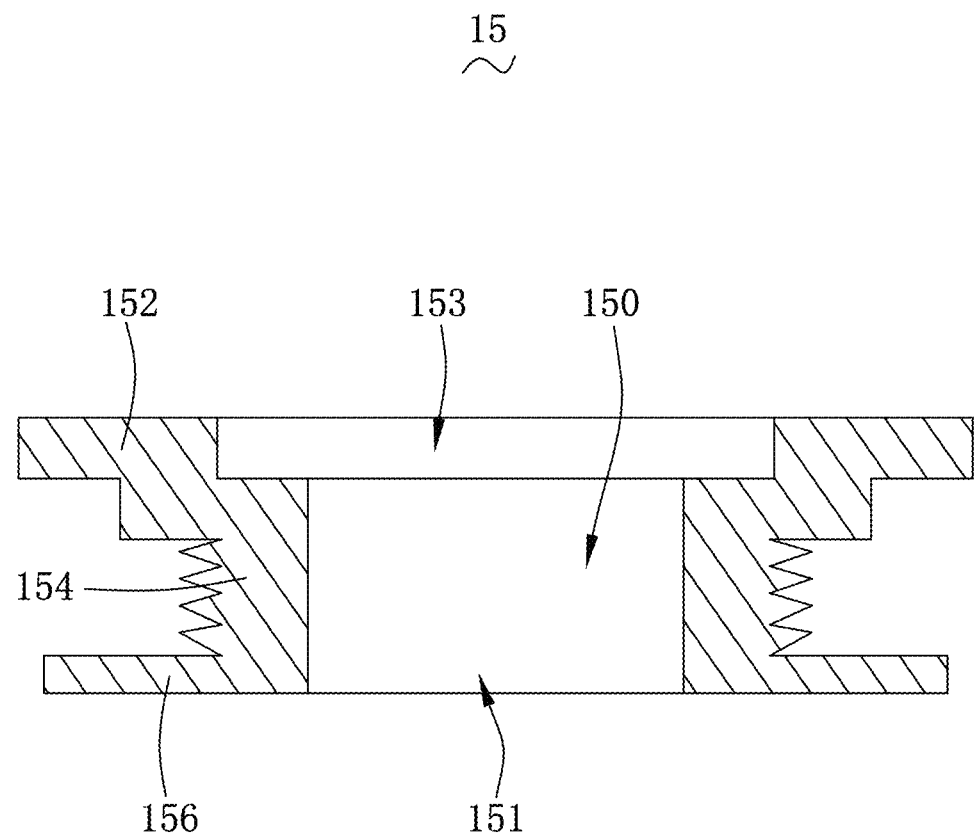
FIG. 3 is a cross-sectional view of the telescopic bracket of FIG. 1 along line III-III.

Referring again to FIG. 3, there is shown a side cross-sectional view taken along line III-III of FIG. 1. When the mobile terminal device 10 is assembled, the driving module 13 is received in the receiving space 110 of the housing 11 and abuts against the first surface 111. The telescopic bracket 15 is disposed on the second surface 113 of the housing 11, and the first opening 151 of the telescopic bracket 15 corresponds to the through hole 115 of the housing 11. The camera module 17 is correspondingly received in the telescopic space 150 of the telescopic bracket 15, and is electrically connected to the driving module 13 after passing through the first opening 151 and the through hole 115. On the other hand, the camera module 17 transmits light through the second opening 153 to achieve imaging.

Figure 4:
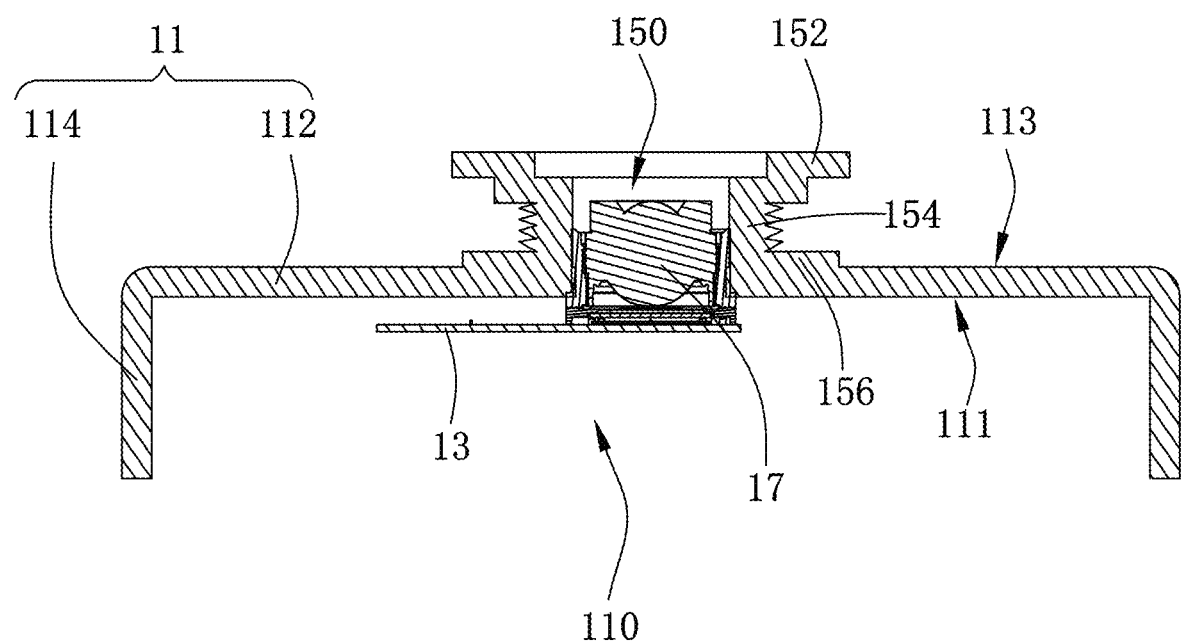
FIG. 4 and FIG. 5 are structures of two working states of the telescopic bracket of the mobile terminal device schematic diagram.
Figure 5:
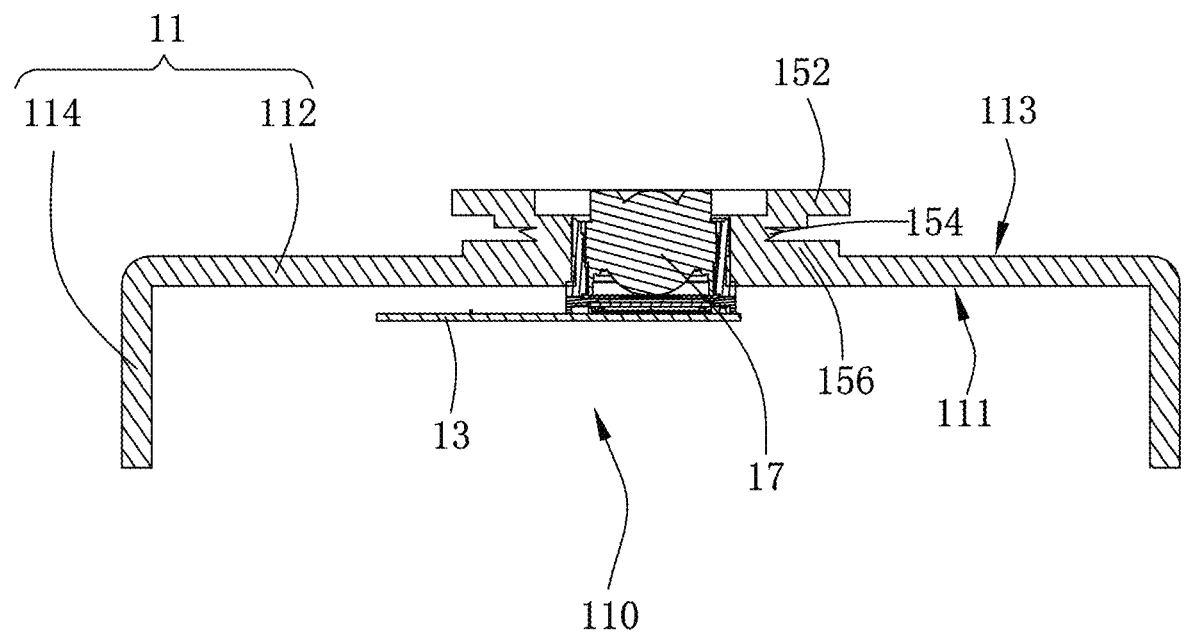

Please refer to FIG. 4 and FIG. 5 simultaneously, wherein FIG. 4 is a schematic diagram of one working state of the mobile terminal device, the telescopic bracket 15 is in an extended state, and FIG. 5 is a schematic diagram of another working state of the mobile terminal, the telescopic bracket 15 is in a contracted state. When it is required to support the mobile terminal device 10 to be supported and fixed on the desktop, the telescopic bracket 15 is in an extended state, which may be an external force to stretch the support portion 152, and the connecting portion 154 is in a stretched state, corresponding to the distance between the second opening 153 and the first opening 151 is increased, and the camera module 17 is adapted to be in a closed state, and cannot satisfy the photographing function.

When it is not necessary to support the mobile terminal device 10, an external force is applied to press the support portion 152 such that the connecting portion 154 is in a contracted state, correspondingly between the second opening 153 and the first opening 151, the pitch is shortened, and the camera of the camera module 17 effectively captures the external environment and realizes the imaging.

In this embodiment, the telescopic bracket 15 of the mobile terminal device 10 may be fixed to the second surface 113 of the housing 11 by adhesive bonding, or may be detachably assembled to the housing 11 by a snap-fit combination. Further, the telescopic bracket 15 can also form an integral structure directly with the housing 11 through the injection molding mode. For those skilled persons in the art, the camera module 17 is surrounded by the telescopic bracket to realize the imaging function or the off imaging function. The structure of switching between two functions belongs to the scope of this disclosure.

Compared with the related art, the camera module 17 of the mobile terminal device 10 of the present invention is integrated into the housing 11 through the telescopic bracket 15, and is electrically connected to the driving module 13 through the housing 11, so that the camera module 17 is no longer limited by the limitation of the overall thickness of the mobile terminal device 10, and the thickness requirement of the camera module 17 is reduced, which is more advantageous for implementing the mobile terminal device 10.

On the other hand, the telescopic bracket 15 can also provide dust protection for the camera module 17 while supporting the telescopic bracket 15 of the mobile terminal device 10 in a specific occasion, by the extension of the telescopic bracket 15 or the transformation of the reduced state realizes switching of the working state of the camera module 17, which is simple and convenient, and easy to operate.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A mobile terminal device, comprising:
    a housing having a receiving space, wherein the housing includes:
    a first surface adjacent to the receiving space,
    a second surface away from the receiving space, and
    a through hole extending through the first surface to the second surface;
    a driving module, wherein the driving module is received in the receiving space of the housing and disposed adjacent to the first surface;
    a telescopic bracket, wherein the telescopic bracket includes two openings that penetrate each other and a telescopic space that penetrates the two openings, the telescopic bracket is disposed on the second surface of the housing, the opening corresponds to the position of the through hole, and
    a camera module, wherein one end of the camera module is electrically connected to the driving module, the other end of the camera module penetrates through the through hole and is received in the telescopic space of the telescopic bracket.

2. The mobile terminal device as described in claim 1, wherein the housing comprises a side wall and a bottom wall, the side wall and the bottom wall enclose the receiving space for receiving the driving module, the through hole is extending from the second surface to the first surface.

3. The mobile terminal device as described in claim 2, wherein the telescopic bracket comprises a support portion, a hollow connecting portion and a fixing portion, which are sequentially connected to each other, and the fixing portion is fixed to the second surface of the housing, the fixing portion includes a first opening corresponding to the through hole of the housing and a second opening, the second opening and the first opening pass through the hollow of the connecting portion, and form a telescopic space in which both ends are opened.

4. The mobile terminal device as described in claim 3, wherein the connecting portion elastically and flexibly connects the supporting portion and the fixing portion.

5. The mobile terminal device as described in claim 4, wherein the fixing portion of the telescopic bracket and the second surface of the housing are fixed by adhesive bonding.

6. The mobile terminal device as described in claim 4, wherein the fixing portion of the telescopic bracket and the second surface of the housing are fixed to each other by a snapping manner.

7. The mobile terminal device as described in claim 4, wherein the fixing portion of the telescopic bracket and the housing are integrally molded by an injection molding mode.

8. The mobile terminal device as described in claim 1, wherein the camera module is in an operating state, when the telescopic bracket is in a contracted state, and the camera module is in an off state, when the telescopic bracket is in an extended state.

* * * * *